United States Patent
Goodman et al.

(10) Patent No.: US 6,417,691 B1
(45) Date of Patent: Jul. 9, 2002

(54) COMMUNICATION DEVICE WITH CONFIGURABLE MODULE INTERFACE

(75) Inventors: Mitchell E. Goodman; Charles B. Swope, both of Coral Springs; Patrick D. Koskan, Lake Worth; Jason A. Rapps, Coral Springs; Daniel A. Tealdi, Hialeah, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/650,933

(22) Filed: Aug. 29, 2000

(51) Int. Cl.[7] .............................................. H01L 25/00
(52) U.S. Cl. ............................. 326/41; 326/38; 326/47
(58) Field of Search ............................... 326/38, 39, 41, 326/47; 710/72, 62

(56) References Cited

U.S. PATENT DOCUMENTS 6,236,917 B1 * 5/2001 Liebl et al. .................... 701/29
6,237,054 B1 * 5/2001 Freitag, Jr. .................... 710/72
6,240,471 B1 * 5/2001 Schlueter et al. ............. 710/62

* cited by examiner

Primary Examiner—Michael Tokar
Assistant Examiner—Anh Tran
(74) Attorney, Agent, or Firm—Barbara R. Doutre; Frank M. Scutch, III

(57) ABSTRACT

A communication device provides for a hardware configurable module interface port by using a programmable logic device (108). The programmable logic device (108) is reconfigured using software stored in memory (106). The reconfiguration of programmable logic device (108) depends on the type of module (110) that is attached to the communication device. Since data translation is not required to be performed by each of the different types of modules that can be attached to the communication device, the time to develop a module is shortened and support circuitry requirements to perform data translation is reduced.

11 Claims, 1 Drawing Sheet

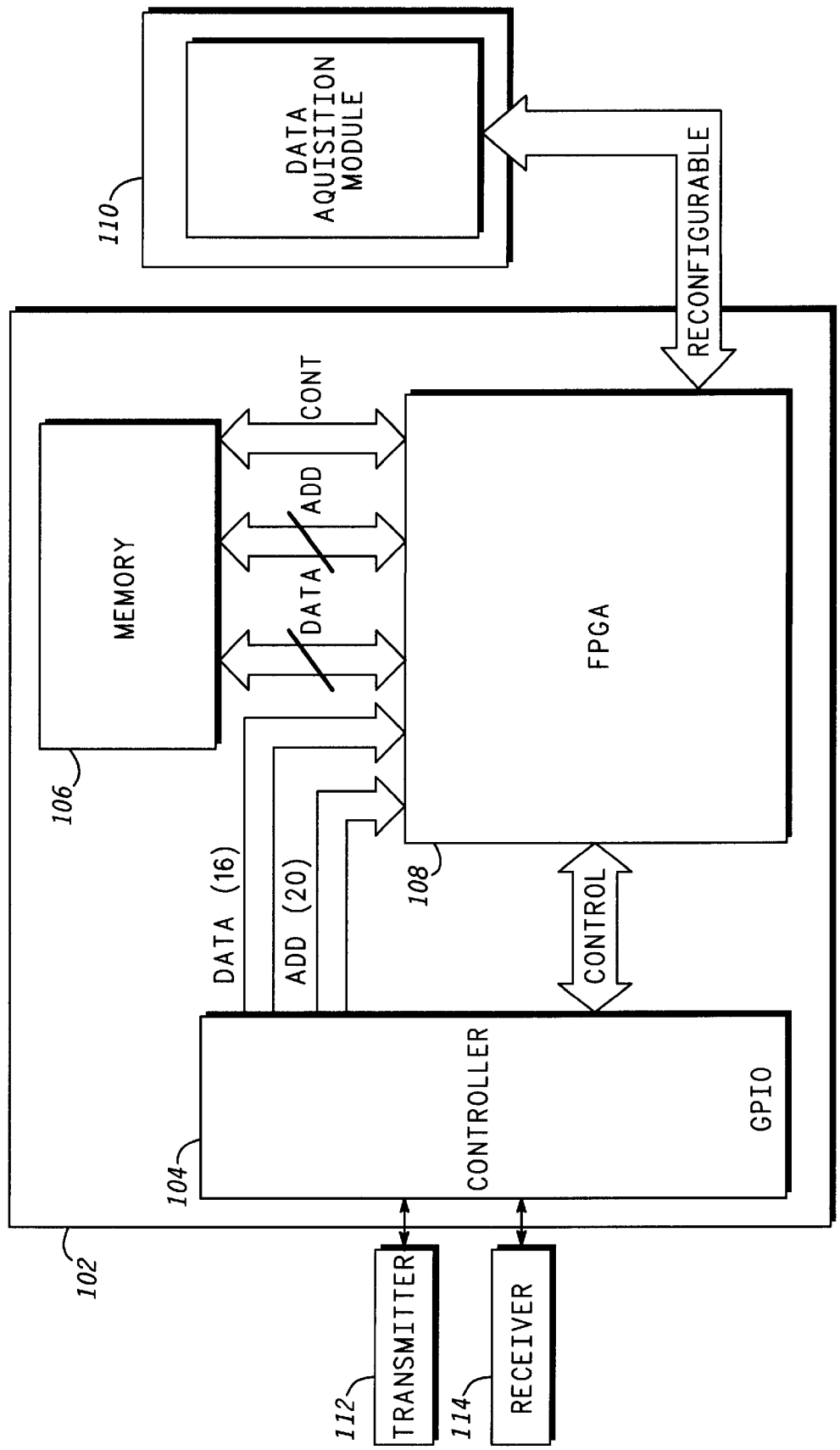

COMMUNICATION DEVICE WITH CONFIGURABLE MODULE INTERFACE

TECHNICAL FIELD

This invention relates in general to communication devices, and more particularly, to a communication device having a configurable module interface.

BACKGROUND

Various applications for wireless data communications require the acquisition of data using electronic devices of varying types and technologies. Once the data is acquired, data processing is typically required before transmission of the information can be performed. One example of such an application is in the area of imaging where an image sensor captures an image, and the image information must be compressed prior to wireless transmission. Another example is in the area of global positioning systems (GPS), where a GPS receiver/decoder receives raw timing data from satellites, which must be processed to provide actual position that is then displayed on a map and/or transmitted.

The VISOR™ personal digital assistant (PDA) manufactured by Handspring, Inc. can be connected to a number of plug-in modules (e.g., image capture device, etc.). The use of a communications capable plug-in module in the VISOR PDA precludes the use of other modules, since the device has no built-in communications capability. The VISOR PDA requires that each of the plug-in modules that is connected to the PDA provide data that is formatted specifically for the central processing unit (CPU) of the PDA. This forces each of the plug-in modules to format the data into a compatible format acceptable to the VISOR's processor. Since data translation is required, the plug-in modules typically will require support circuitry to perform the data translation. This extra circuitry increases the size and cost of the plug-in modules. A need thus exists in the art for a communication device that can provide for a reconfigurable hardware interface between different interchangeable modules and the device itself. This would allow for the data acquisition modules to provide information to the communication device's controller circuit in a data format that is native to the data acquisition being performed, thereby reducing the complexity and -cost of the modules and system.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 1 shows a block diagram of a communication device with an interchangeable module attached in accordance with the invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a communication device comprising a base unit 102 and a conventional transmitter 112 and/or conventional receiver 114. Transmitter 112 and receiver 114 are preferably radio frequency devices, although they could also comprise devices for wireline transmission and reception of data via a network. Base unit 102 includes a controller 104 such as a microprocessor or microcontroller or other circuitry forming a controller unit as known in the art. Controller 104 is coupled to a programmable logic device 108 such as a field programmable gate array (FPGA), a complex programmable logic device (CPLD), etc. via a bus that includes data, address and control lines.

Also included in base unit 102 is a storage area such as memory 106. Memory 106 is coupled to FPGA 108 and provides the reconfiguration information for FPGA 108 based on a data acquisition module 110, such as an image capture module that is connected to the base unit's module interface. Memory 106 also includes the software needed to process the information provided by module 110. By using a programmable logic device 108 the base unit's module interface can be reconfigured depending on the module that is attached to base unit 102. This provides tremendous flexibility in the design and use of the data acquisition modules 110, such as an image capture module, for example, a camera.

The programmable interface of the present invention allows otherwise incompatible data steams from the different types of data acquisition. modules 110 to be interfaced to the controller 104 with minimal data conversion hardware and software located on the data acquisition module 110. By reconfiguring the FPGA 108 and thereby the hardware module interface via software, the different types of plug-in modules 110 can provide information to the base unit 102 in a protocol that is native to the plug-in modules. For example, a GPS module which provides serial data does not need to have onboard serial to parallel conversion capability in order to communicate with base unit 102. The FPGA would provide for the data conversion needed. The FPGA 108 also provides for any changes in timing needed by the particular module attached to base unit 102. Upon attachment of a module 110 to base unit 102, the base unit 102 determines the type of module that is attached. The controller 104 then causes memory 106 to provide the necessary reconfiguration information to FPGA 108 in order to support the particular module that is attached.

The use of the reconfigurable module hardware interface using a programmable logic device such as FPGA 108 as described above, provides for added flexibility when designing plug-in modules that will be used with base unit 102. Also, the reconfigurable interface reduces the module design efforts since the module designer does not have to worry about adhering to a specific bus protocol required by base unit 102. Since new data acquisition modules can be designed after the base unit 102 is in use, it is preferable that memory 106 can be designed so that it can be updated as new modules are introduced in order to support the new module's interface configuration requirements. This can be accomplished by using flash memory or other upgradeable memory devices.

The present invention provides for a simple yet effective solution to devices that can support different types of plug-in modules. It also provides for opportunities for the device manufacturer to charge a fee to users that both enables and operates different types of modules in certain applications.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A communication device which can receive different types of interchangeable modules, the communication device comprising:

a controller;

a programmable logic device responsive to the controller for providing a reconfigurable module interface port for receiving the different types of interchangeable modules without any restraint on pin functionality; and a dedicated memory coupled directly to the programmable logic device.

2. A communication device as defined in claim 1, wherein the programmable logic device comprises a field programmable gate array (FPGA).

3. A communication device as defined in claim 1, wherein the programmable logic device comprises a complex programmable logic device (CPLD).

4. A communication device as defined in claim 1, wherein the memory provides configuration information to the programmable logic device whenever a different interchangeable module is attached to the communication device.

5. A communication device as defined in claim 1, wherein the programmable logic device translates data that is received from and sent to the interchangeable modules into data that is compatible with the controller.

6. A communication device as defined in claim 1, wherein the programmable logic device changes hardware interface provided to the different types of interchangeable modules that are received by the communication device.

7. A communication device, comprising:

a module interface port for receiving a module;

a programmable logic device coupled to the module interface port for configuring the module interface port based on the module that is coupled to the module interface port without any restraint on pin functionality; and a dedicated memory connected directly to the programmable logic device.

8. A communication device as defined in claim 7, wherein the programmable logic device comprises a field programmable gate array (FPGA).

9. A communication device as defined in claim 7, wherein the programmable logic device comprises a complex programmable logic device (CPLD).

10. A communication device as defined in claim 7, wherein the programmable logic device reconfigures itself in order to provide both hardware and timing support to the module that is coupled to the module interface port.

11. A communication device as defined in claim 7, further comprising a controller and the programmable logic device provides for data translation between the controller and the module that is coupled to the communication device.

* * * * *